US009118695B1

(12) United States Patent
Korhonen

(10) Patent No.: US 9,118,695 B1
(45) Date of Patent: Aug. 25, 2015

(54) SYSTEM AND METHOD FOR SECURE OPTIMIZED COOPERATIVE DISTRIBUTED SHARED DATA STORAGE WITH REDUNDANCY

(75) Inventor: Aki Korhonen, Reno, NV (US)

(73) Assignee: PC-Doctor, Inc., Reno, NV (US)

( * ) Notice: Subject to any disclaimer, the term of this patent is extended or adjusted under 35 U.S.C. 154(b) by 763 days.

(21) Appl. No.: 12/503,222

(22) Filed: Jul. 15, 2009

Related U.S. Application Data

(60) Provisional application No. 61/080,888, filed on Jul. 15, 2008.

(51) Int. Cl.
| | |
|---|---|
| *G06F 15/16* | (2006.01) |
| *H04L 29/08* | (2006.01) |
| *G06F 17/30* | (2006.01) |
| *G06F 3/06* | (2006.01) |
| *G06F 11/14* | (2006.01) |

(52) U.S. Cl.
CPC ............ *H04L 67/1095* (2013.01); *G06F 3/065* (2013.01); *G06F 3/0653* (2013.01); *G06F 11/1464* (2013.01); *G06F 17/30575* (2013.01); *H04L 67/1097* (2013.01)

(58) Field of Classification Search
USPC ......... 709/200, 218, 248, 203–206, 223–224; 711/162
See application file for complete search history.

(56) References Cited

U.S. PATENT DOCUMENTS

| | | | | |
|---|---|---|---|---|
| 7,055,008 | B2 * | 5/2006 | Niles et al. ..................... | 711/162 |
| 7,346,733 | B2 * | 3/2008 | Kitamura ....................... | 711/114 |
| 7,444,360 | B2 * | 10/2008 | Frondozo et al. ..................... | 1/1 |
| 8,219,632 | B2 * | 7/2012 | Jarvis et al. .................... | 709/213 |
| 2002/0055972 | A1 * | 5/2002 | Weinman, Jr. ................. | 709/203 |
| 2003/0014477 | A1 * | 1/2003 | Oppenheimer et al. ...... | 709/203 |
| 2003/0154238 | A1 * | 8/2003 | Murphy et al. ............... | 709/201 |
| 2004/0267696 | A1 * | 12/2004 | Brown et al. ..................... | 707/1 |
| 2005/0050227 | A1 * | 3/2005 | Michelman ................... | 709/245 |
| 2005/0071436 | A1 * | 3/2005 | Hsu et al. ....................... | 709/212 |
| 2006/0074912 | A1 * | 4/2006 | Borthakur et al. ................. | 707/9 |
| 2006/0095470 | A1 * | 5/2006 | Cochran et al. ............ | 707/104.1 |
| 2006/0212439 | A1 * | 9/2006 | Field ................................. | 707/4 |
| 2006/0230076 | A1 * | 10/2006 | Gounares et al. ............. | 707/200 |
| 2007/0143357 | A1 * | 6/2007 | Chaudhri ....................... | 707/201 |
| 2009/0307329 | A1 * | 12/2009 | Olston et al. .................. | 709/214 |
| 2011/0047356 | A2 * | 2/2011 | Flynn et al. .................... | 712/220 |
| 2011/0099148 | A1 * | 4/2011 | Bruning, III .................. | 707/639 |
| 2011/0282837 | A1 * | 11/2011 | Gounares et al. ............. | 707/634 |
| 2014/0059018 | A1 * | 2/2014 | Fienblit et al. ................ | 707/692 |
| 2014/0250083 | A1 * | 9/2014 | Wolfe ........................... | 707/652 |

\* cited by examiner

*Primary Examiner* — Joshua Joo
(74) *Attorney, Agent, or Firm* — Baker & Hostetler LLP

(57) ABSTRACT

Embodiments relate to a computer-based method of checking a network to determine whether a certain number of copies of data are backed up onto the peer devices of the network. If the certain number of copies of the data are not backed up on the peer device on the network, then backing up the data on one or more network devices. If the certain number of copies of the data are backed up on the peer device of the network, then not backing up the data on the one or more network devices.

33 Claims, 8 Drawing Sheets

Data sequence creation

Data Identifier Creation

Communication data structures

SYSTEM AND METHOD FOR SECURE OPTIMIZED COOPERATIVE DISTRIBUTED SHARED DATA STORAGE WITH REDUNDANCY

CLAIM OF PRIORITY

This application claims priority from the following application, which is hereby incorporated in its entirety: U.S. Provisional Application No. 61/080,888 entitled "SYSTEM AND METHOD FOR SECURE OPTIMIZED COOPERATIVE DISTRIBUTED SHARED DATA STORAGE WITH REDUNDANCY", by Aki Korhonen, filed Jul. 15, 2008.

BACKGROUND

Backup systems typically use external storage devices, such as storage tapes or storage area networks to back up device data.

SUMMARY OF THE INVENTION

Embodiments of the present invention describe a system and method by which a grouping of computing devices such as personal computers can provide redundancy of individual device stored data by mutually distributing copies of it. The system can use a method for optimizing the amount of data to be distributed, to reduce unnecessary duplication of data. In one embodiment, the redundancy level can be specified, so that copies of data that is of lesser value is distributed to fewer devices, and copies of data that is more valuable can be distributed to more devices. Information security can be provided by access control and encryption processes. In one embodiment, a method can assure that, assuming there are a sufficient number of devices participating in the distribution of data, no single device contains all the information needed to recreate the original content of the distributed data. The method can also use a mechanism to hide identifying information such that it is difficult for an unauthorized party to recreate the distributed data even if access to all devices were available.

DETAILED DESCRIPTION

Figure 1A:
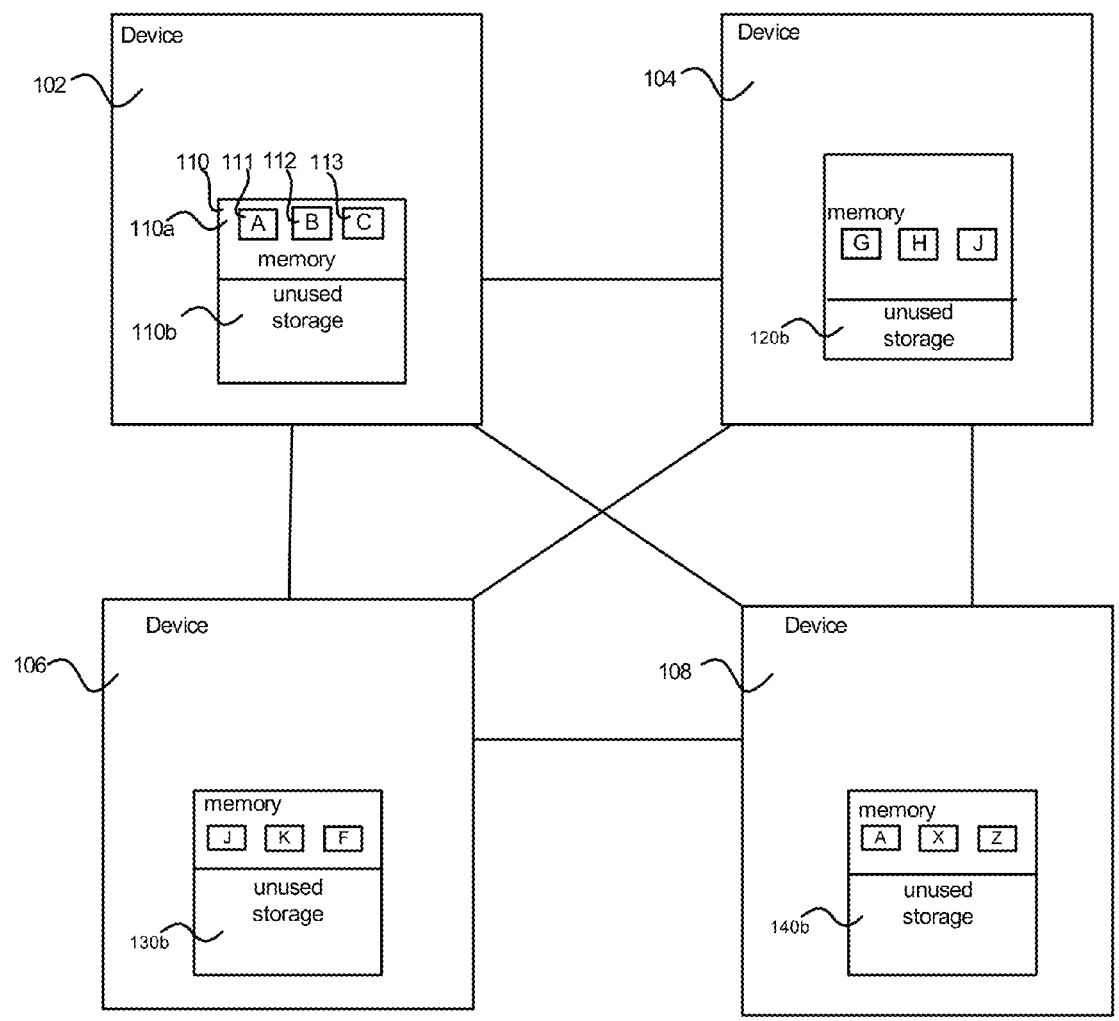
FIGS. 1A-1E illustrates examples of a network of devices of the present invention.

FIG. 1A shows an exemplary network 100 that includes devices 102, 104, 106 and 108. The devices can be any type of device, such as computers or cell phones. The network can be any type of network.

The devices can include memory, such as memory 110 that can contain data 110A all or some of which is to be backed up and unused storage 110B. The data 110A can consist of sequences of data 111, 112 and 113. Embodiments of the present invention use the unused storage 120B, 130B and 140B to back up the data on the devices.

Figure 1B:
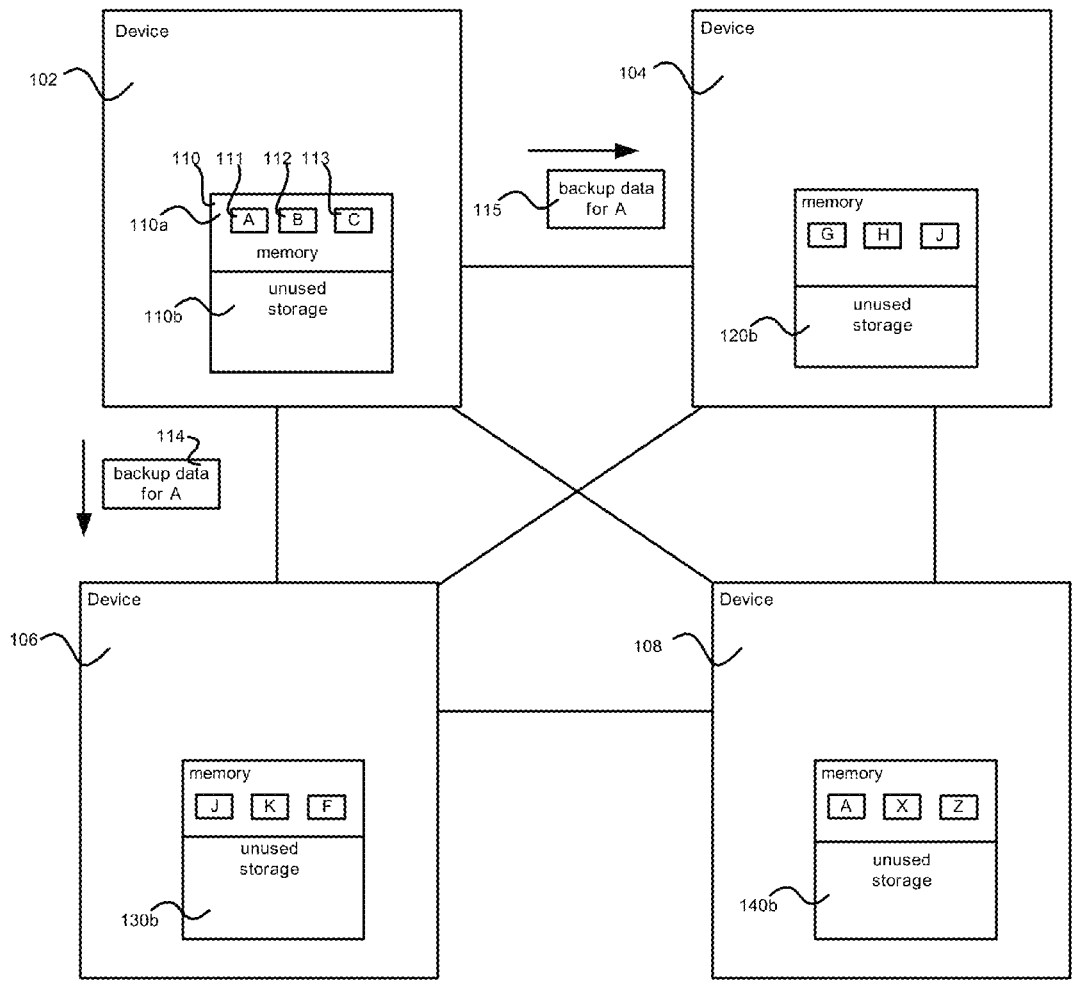

FIG. 1B shows device 102 storing backup data 114 and 115 for sequence 111 onto device 106 and 104 in their respective areas 120B and 130B.

Figure 1C:
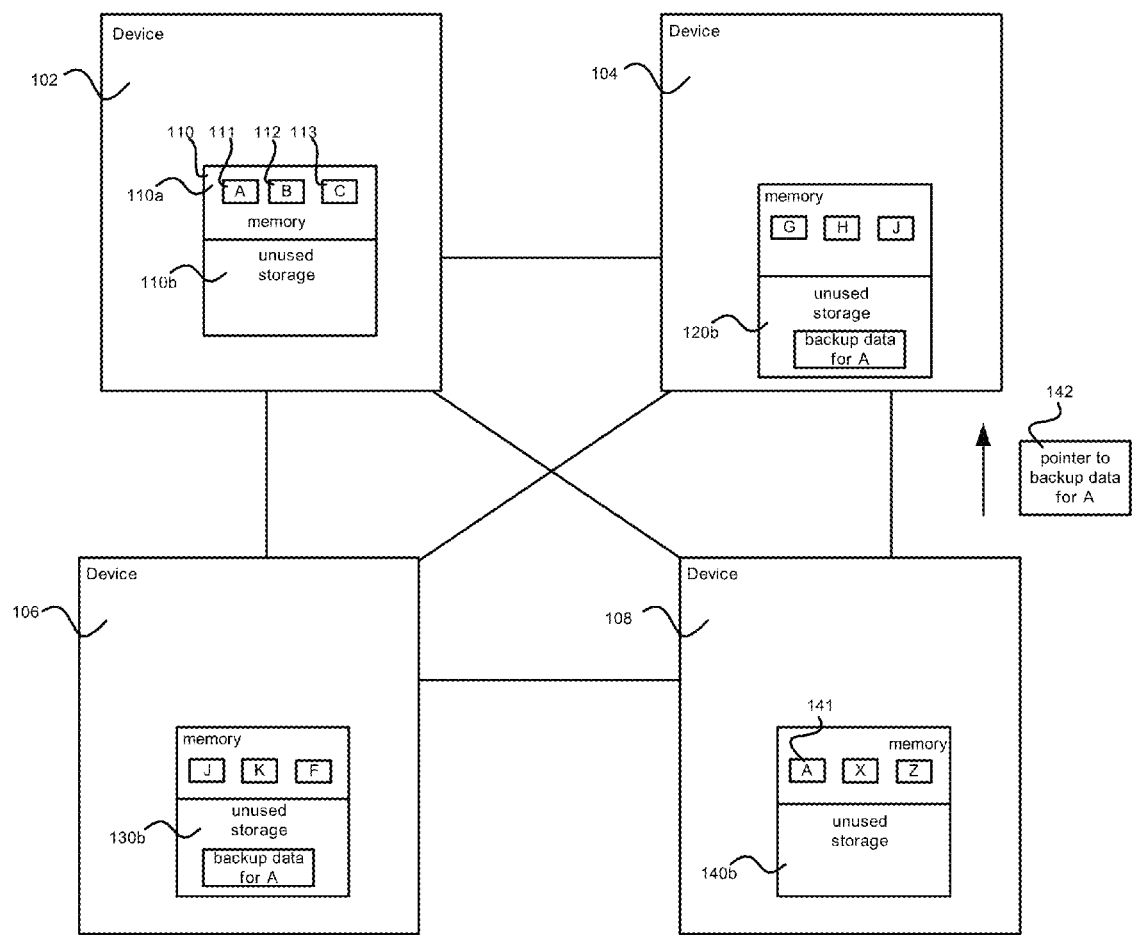

In FIG. 1C, before device 108 does a backup of sequence 141 to device 104, device 108 checks the other devices to see if the content of sequence 141 has previously been stored as a backup in other devices. In this case, the sequence 141 is identical to sequence 111, backups of which are already stored in device 104 and 106, so the device 108 can instead send a pointer 142 to the previously stored data on device 104. The pointer will typically be smaller than a full backup, thus, conserving memory use.

Figure 1D:
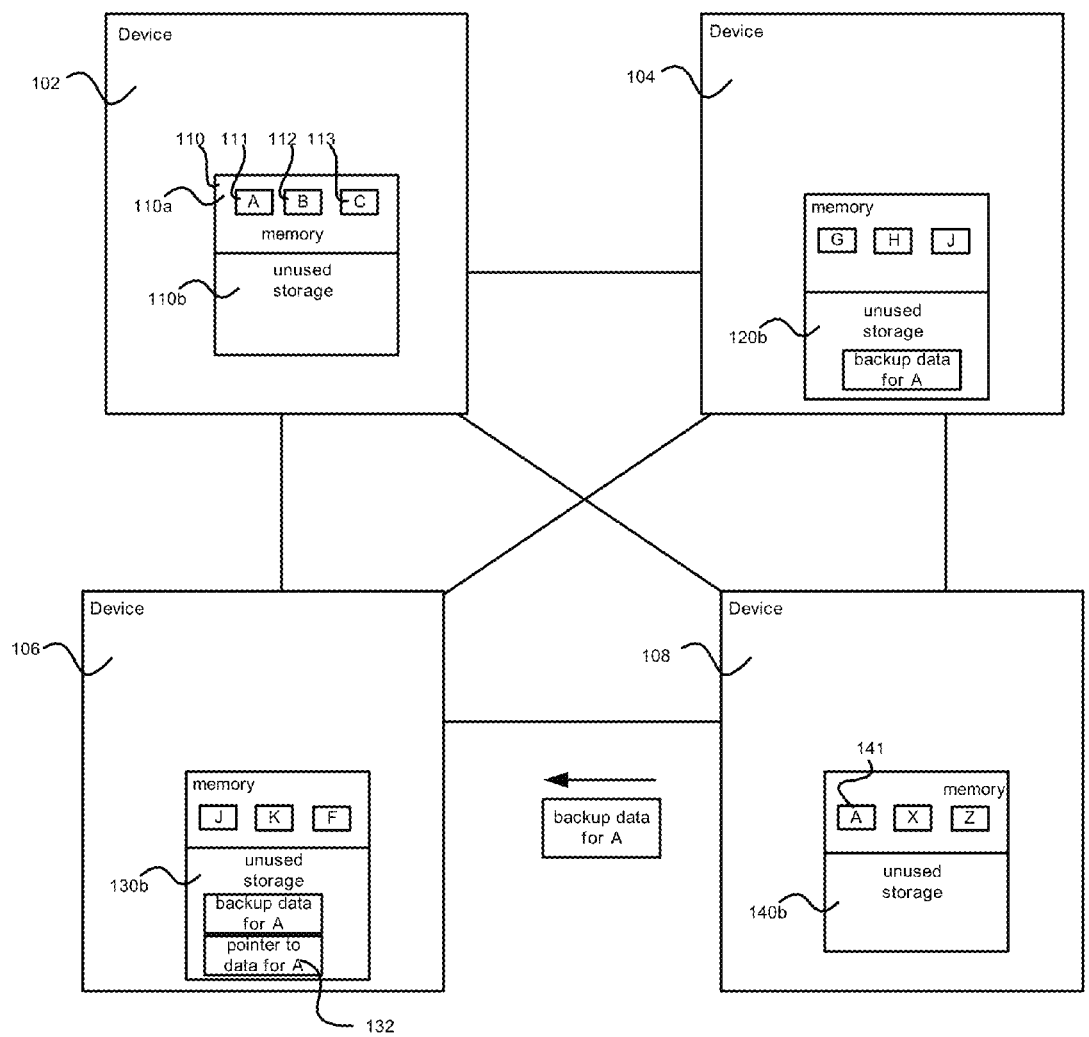

In FIG. 1D, device 108 does a backup of sequence 141 to device 106 even though the same sequence already exists on device 106. Device 106 can detect that the data content is already in the backup area and instead of duplicating the data, stores a pointer 132 to the data that's already present.

Figure 1E:
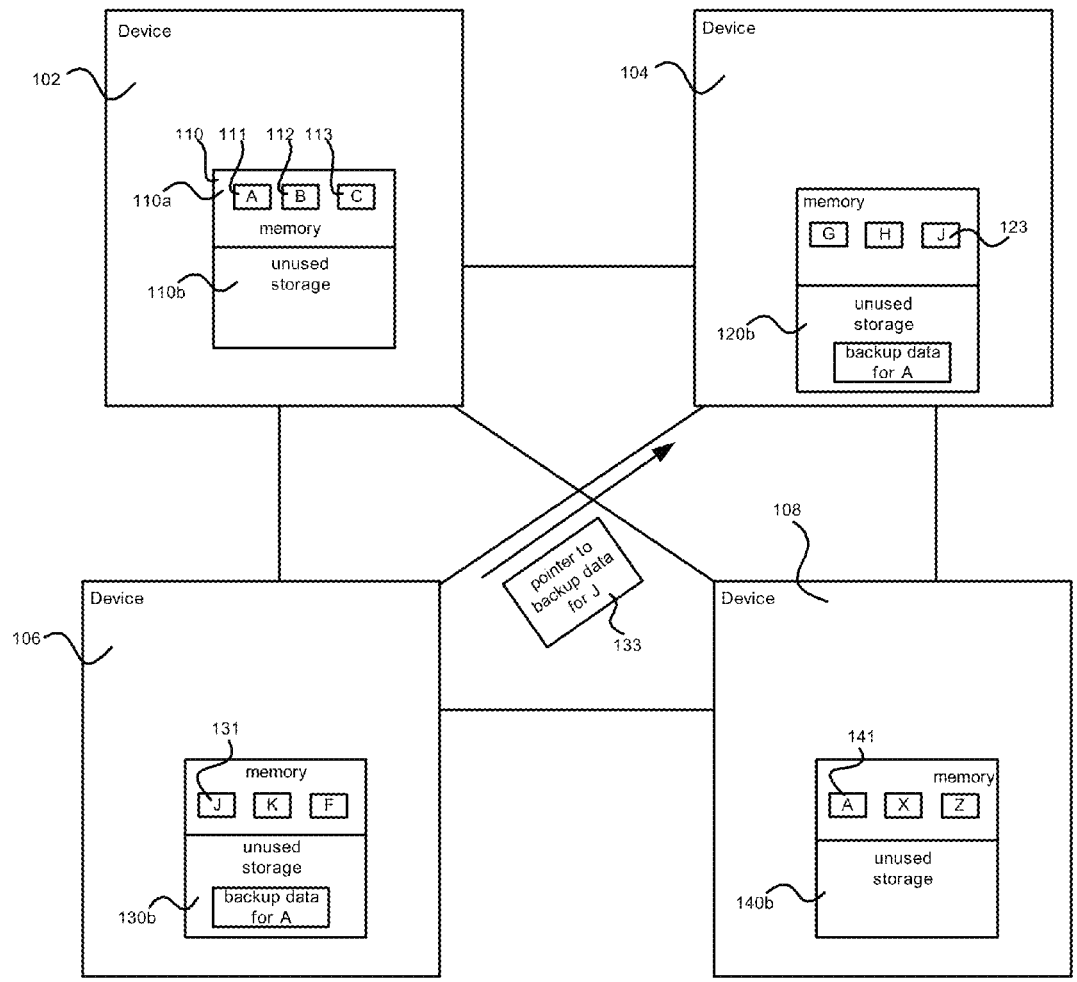

In FIG. 1E, device 106 intends to back up sequence 131, but before it does, it detects that the same data 123 is already in the working memory of device 104. Device 106 chooses to instead send a pointer 133 to the working memory data on device 104. The pointer is typically smaller than a full data sequence, thus, conserving memory use.

One embodiment of the present invention is a computer-based method that comprises checking a network to see if a certain number of copies of data are backed up onto peer devices of the network. If a certain number of copies of the data are not backed up on the peer devices of the network, the data is backed up on the one or more network devices. If the certain numbers of copies of the data are backed up, the data is not backed up on the one or more network devices. In one embodiment, a pointer to the data is stored instead.

In one embodiment if the data is present in the working memory of a certain number of target devices, it is not backed up.

In one embodiment if the target device detects that a new data sequence is identical to an already backed up data sequence on the same target device, the target device stores a pointer to the first data sequence instead of storing the same data multiple times. The data can be divided into stripes before storing the data. The stripes can include parity stripes. The stripes can be variably sized depending on the sequence size and need not to correspond to storage device boundaries. Striping can follow any of the well known computing methods, such as those employed in Redundant Array of Inexpensive Disks (RAID).

The number of backups can depend on the type of data. For example, sequences comprising executable program code can be stored in fewer copies than other types of data, as they ordinarily can also be restored from other sources, such as a backup media from the executable software vendor. More valuable sequences, such as data that is unique to a device or representing work product, or is of inherently higher value, can be backed on more devices to increase redundancy.

Figure 2A:
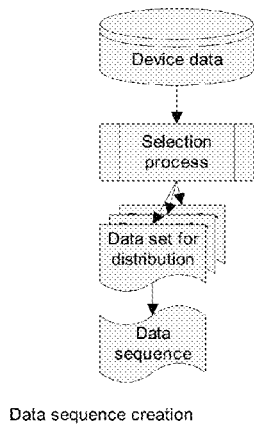
FIG. 2A illustrates data sequence creation of one embodiment.
Figure 2B:
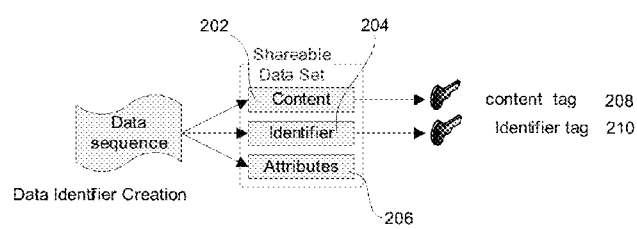
FIGS. 2B-2C illustrates tag creation of one embodiment.

The data can comprise content that is used to create a content tag 208, as shown in FIG. 2B. A content tag 208 can be used to find any other copies of the same data sequence backed up content on the network.

Content is usually associated with an identifier 204, as shown in FIG. 2B, that specifies the location of the content on the device. The identifier 204 is used to create an identifier tag 210. The identifier tag 210 can be sent to other devices in the network so that data sequence content 202 and its identifier 204 can be queried for on other devices without disclosing the actual data.

In one embodiment, the distribution of the data uses a first number of copies as a threshold, but the redistribution of the data can occur when the number of copies drops below another lower threshold.

In one embodiment, the devices in the network can use one or more device identifiers to identify the device to others as a participating target device, and to identify the device as an originating device when it stores data onto other devices. Typically one or two device identifiers are used, either the same identifier for either purposes, or a different device specific identifier for each purpose.

In one embodiment, this system can provide data backup in an interconnected environment, in which individual devices can share their data with other devices, so that the shared data can be recreated if the original is destroyed. The system can use a mechanism for identifying participating devices, a method for optimizing the data to be distributed, a mechanism for adding inherent security to the distributed data, a mechanism for adding encryption to the distributed data, a mechanism for managing distributed data from other devices, and a mechanism for restoring distributed data.

Methods can be used to identify devices to inter-operate for a common purpose. Communications protocols and methods can be used for routine communications between such devices.

Methods can be used to identify data to be processed. Such data can consist of any type of computing information, such as files, memory images, and device state. The data can be identified using methods such as those employed by tools such as the Windows Backup application. Data is generally processed as one or more sequences of basic computing units, such as bytes. One typical method is shown in FIG. 2A.

Embodiments of the present invention can include striping and parity methods applied to variable length and relatively short data sequences. The benefit of striping is a reduced redundancy requirement.

Devices participating in this distributed storage architecture can have one or more unique identifiers. One is typically used to identify the device to others as a participating target device. A second is typically used by the device to identify it when storing data on other devices. There are many well known formats for unique identifiers, sometimes referred to as Globally Unique Identifiers (GUID), and there is no requirement for any specific format for these identifiers. The identifiers should be in a form that can be maintained across failures of a device, or that can be recreated after such failure. A method for recovering lost data as a result of a failure of the originating device can be to use its identifier to locate distributed data from other devices. One method for achieving these goals is to use a human readable format for the identifier that is transformed to a computer readable numeric identifier upon entry. While there is no requirement for an identifier to be numeric, there are data security aspects that encourage the use of numeric identifiers over other forms.

Methods of the present invention can be used on any data sequence, such as a file on a storage device or any other set of data. The machine presentation of the data sequence is not a factor for this patent, and it can be applied equally to any set of data. As shown in FIG. 2A, for purposes of processing, a set of data can be first stored into one or more sequences of data, using data and device specific methods for data serialization if necessary. Such methods are well known in the industry, for example including serializing application and operating system state data, accessing storage volume files, and reading Random Access Memory (RAM).

Embodiments of the present invention can use one or more of the many well-known methods for identifying data sequences within a device that need to be processed. For example, for data stored on storage volume with a file system, all files could be selected, or only files that have an "archive" bit set might be chosen. Further, a user might choose to restrict processing to only some files, or to exclude some files or folders of files. Data that is not stored in a file-like format might be chosen for backup using similar criteria, or other criteria that is device specific. For example, on a cellular phone or a wrist watch with an appointment calendar, each individual calendar entry may be a processable data sequence, using the native format of the device, or some other format.

As shown in FIG. 2B, once a data sequence has been chosen for processing, it can first be broken into three parts. The first set can represent a fixed sequence of content 202, such as the bytes contained within a file. The second set can represent an identifier 204 within the context of the originating device, such as the operating system file name. The third set can consist of variable attributes 206 that might change from time to time during normal use of the device, such file attribute bits or data access times.

Figure 2C:
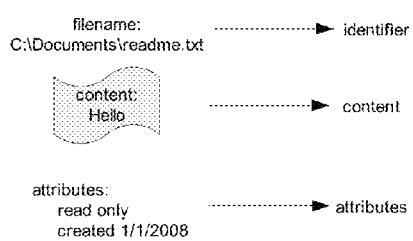

The characteristic of the first set, the content 202, is that it might be the same for multiple sequences of data. The characteristic of the second set, the identifier 204, is that it is a unique identifier in the context of the originating device for the first set, in a similar manner that a file is identified by the folder path and its file name, as shown in FIG. 2C. The third set, the attributes 206, can be values that are expected to change from time to time. Changes to the attributes by themselves do not indicate that a shared data sequence is no longer valid. Examples of attribute data are the creation date of the sequence, the last access date for the sequence on the originating device, and an access control list specifying what privileges users have in relation to the data. Attributes may be different for each device. Attributes can be represented as a sequence of data in any well known format, such as XML, binary structures, file system formats, and operating system specific resource files.

The content 202 of the data sequence can be used to generate a content tag 208 that is unique for a given data sequence. The content tag 208 can consist of one or more identifying numbers generated using any of the well known methods for computing highly unique identifying numbers from a set of data, such as the Cyclic Redundancy Check, various Linear Feedback Shift Registers, Hash Algorithms, Message Digest Algorithms or Secure Hash Algorithms. An option is to compute two or more content tags using different methods, so that the likelihood of two dissimilar sequences of data producing the same content tag 208 is reduced further.

The content tag 208, for the content, can also incorporate the amount of data, for example the number of bytes, making up the content, to further add to the uniqueness of it. Security can be a concern for very short sequences, where the data could potentially be reconstructed from the content tag 208 alone. The computing effort can be significant, however, and several well-known methods exist for making such computations more demanding.

The selection of the algorithm for computing the content tag 208 is not a factor, as long as the algorithm is consistent for all devices participating in a distribution relationship, and it generates a highly unique tag given the characteristics of the data being distributed. An identifier for the algorithm used to generate the content tag can be incorporated into the content tag 208, so that in an environment with multiple algorithms the comparisons can take place with the appropriate one. For example, some devices with lesser computing power might choose to use a less computing intensive algorithm. On the other hand, a device with a large number of data sequences can necessitate the use of more intensive algorithms that have a higher likelihood of uniqueness. In some environments the content tag 208 might be composed of the results from multiple algorithms, which can be used individually or as a group.

The characteristic for the content tag 208 is that the same sequence of content 202 will create the same identifier on any of the participating devices.

The data sequence is associated with a content tag 208 as described above. This content tag 208 is used to hide the underlying content 202 from third parties that have no need to know the content 202 itself, but only need a method for determining if a data sequence content 202 is already present on other devices.

A data sequence identifier tag 210 is generated from the underlying data sequence identifier 204 using an algorithm similar to the ones described for generating an identifier for the data sequence content. It can be the same algorithm, or it can be a different one. In one embodiment, the identifier tag 210 is unique within the context of the originating device. In one embodiment, the originating device identifier is incorporated into the identifier tag.

Ordinarily backup processes make complete duplicates of data to be backed up. In an organization that uses multiple similar devices with largely identical data, this will lead to repetitive duplication of the same data. Embodiments of the present invention address this inefficiency by providing, as a user-specified option, a method for not duplicating data sequences that are well established within the device data of participating devices.

Prior to distributing a sequence of data 200, the originating device can determine if participating devices already contain the same content 202. This determination can be done by issuing the previously computed data sequence content tag in the form of a request to the participating devices, to which the participating devices respond by indicating if they also have the same data sequence content, and optionally if the related sequence is in the active device data area, or in the area of memory used for shared backup.

For purposes of efficiency, multiple data sequence related requests can be combined into a single transaction to reduce communication overhead between devices, and to reduce communication related latency in processing data sequences.

If data sequence content is present on participating devices, the originating device can make a decision if the duplication is sufficient. The sufficiency is defined by the user, by administrative settings, or other factors, and can consist of several levels, for example requiring additional levels of duplication for working data sequences that represent active work product of devices or its users, and lesser duplication for fixed sequences representing content, that conceivably could also be restored by, for example, reinstalling an application, an operating system, or device firmware.

By way of an example, a user might have specified that data sequences representing documents must be duplicated at least five times across participating devices before the sharing of the data sequence is not required, but that for data sequences representing executable code, that is also present in other forms, only need to be duplicated two times.

For purposes of this decision, the "duplication" of data sequences can refer to the same content existing on participating devices including the originating device. This can define a single duplicate to mean that one participating device in addition to the originating device has the same data sequence content.

In one embodiment, the decision not to process data sequence content is only limited to the content 202. The identifier 204 and attributes 206 can be still processed as if the data sequence content was also present, as described below.

Figure 3:
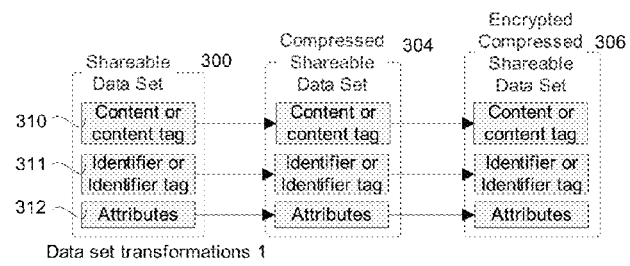
FIGS. 3 and 4 illustrate exemplary data set transformations of one embodiment.

As shown in FIG. 3, prior to distribution, a shareable data set 300 is generated, that consist of three parts. The first part consists of data sequence content or a content tag 310 and a data sequence identifier 311. The second part can consist of the data sequence attributes 312. The partitioning allows attributes 311 and identifiers 312 to be replaced for a given data sequence content 310 without changes to the other part. It also allows multiple devices to use the same backup copy of the data sequence content 310, with differing identifier 311 and attributes 312. In the first part, the data sequence content is optional and can be replaced by a content tag, as the method described above might determine that the data content 310 is sufficiently duplicated to not need sharing. In this embodiment, the data sequence identifier 311 is mandatory, as it defines the existence of the data sequence for future reference. In one embodiment the identifier 311 can also be omitted, with the originating device using other well known methods for establishing links between identifiers 311 and the related content 310, for example via backup manifest files stored off line, or as separate backed up data sequences, or via attributes 312. In one embodiment the identifier can also be replaced by an identifier tag.

The shareable data set 300 can be reduced in size by using a compression algorithm into a compressed sharable data set 304. This step is optional, but if applied, can be done independently to each part of the shareable set. It is possible to combine the compression of all parts in a single set, but this can increase network bandwidth and computing requirements for participating devices at a later time if only a single part is updated, without changes to the other parts.

After compression, the compressed shareable data set 304 can also optionally be encrypted using any of the many well known encryption methods into an encrypted data set 306. If encryption is used with compression, it should take place after compression, as encrypted data is unlikely to be compressible. A variety of password systems, types of key storage and encryption algorithms can be used. Encryption of shareable sets can make it more difficult for multiple originating devices to share the same shareable set for redundancy, as the decryption keys are not necessarily known to all participating devices and their users. It is possible to use well known encryption key authorization and storage schemes to allow the sharing of decryption keys by multiple devices. It is also possible that content that is more confidential is encrypted on a per device basis, whereas content of lesser sensitivity is not encrypted, or its decryption keys are made available to all authenticated participating devices by the originating or target device. Many well known industry protocols and methods exist for such ad-hoc, peer to peer and server centric encryption, key sharing and authentication processes.

If encryption is applied, it can be done separately to parts of the shareable set. Encrypting each part separately is not a requirement, however should encryption be applied to the entire shareable set as a whole instead of individually to its parts, any changes to only one part of the set could require the effort of decrypting and re-encrypting the entire data set on a target device so that only the one part can be updated, or that the entire shareable set be redistributed for changes to just one part.

Data sequences can be stored using any number of redundant data storage methods. Several such methods are generally described as Redundant Arrays of Inexpensive Disks (RAID), which specifies multiple methods for data redundancy in an environment with multiple drives. RAID specifications exist for "mirroring" data across multiple devices, so that all but one device can be unavailable and the data remains retrievable, and for "striping" data across multiple devices, allowing for the unavailability of one or more devices while the data remains retrievable. RAID specifications can also be mixed, for example "mirroring" a "striped" set of data. Other methods can also be used, and one in particular is described here. The benefit of "mirroring" is that each device has a complete set of data. The benefit of "striping" is additional flexibility in specifying data backup redundancy as something less than complete copies across multiple systems.

The distribution to participating devices can take place in accordance with any number of well known network protocols.

The choice of striping and redundancy method is up to the user or administrator, and can be static or change dynamically. For example, different types of data sequences might have different levels of redundancy requirements, so that data sequences containing user of device work documents might be specified to be redundant such that 50% of target devices can be unavailable yet the entire data sequence can be restored. At the same time, data sequences containing executable code that is also available in other storage forms might only be redundant to a degree that only any single target device can be unavailable. In this example the distinction between a percentage of target devices and the absolute number of target devices is intentional.

For ease of use, the redundancy can be expressed as two positive integers, a target device count, and parity device count. The target device count can indicate the number of target devices that will be used to share the shareable sets. The parity device count can indicate the number of target devices that will contain parity data. The number of parity devices should be less than or equal to the device count. If the number of parity devices equals the target device count, then each target device receives a complete shareable set. If the parity device count is one (1) and the target device count is higher than one (1), the shareable set will be distributed across multiple target devices, and one of the target devices will be used for storing parity information.

If multiple targets and parity is used, the method applied can be any well known algorithm that divides a block of data across multiple storage targets, and compute one or more sets of parity information for restoring the data in case one or more of the storage targets are unavailable. The same algorithm can be used for all data storage for all participating devices, or the algorithm that was used can be retrievable by devices at a later time for purposes of reconstructing the original data sequence.

The redundancy requirements in combination with the number of available target devices can determine the nature of the algorithm to be used. The number of available target devices can be based on the enrollment and detection process described later.

If the number of available target devices is less than the required target count, then the desired redundancy is not achievable and the user or administrator can be notified. If the originating device knows that other potential target devices exist, but are unavailable at the time of the initial attempt, it can choose to proceed with the assumption that those other targets become available later. In that case, alerts may be suppressed for some appropriate time chosen by the originating device, or a user or administrative setting, to give the originating device time to retry the operation.

If the number of available target devices is higher or the same as the required redundancy, then the shareable set can be stored on target devices according to the chosen algorithm.

If the chosen algorithm distributes a shareable data set across multiple target devices, the individual blocks, and any related parity blocks, can be known as stripes. The size of the stripes can depend on the algorithm chosen. Smaller stripe sizes can create less wasted storage space if there are a large number of smaller shareable data sets. Some algorithms use a stripe size of one computing unit, such as a byte, allowing for the highest level of storage efficiency.

Figure 4:
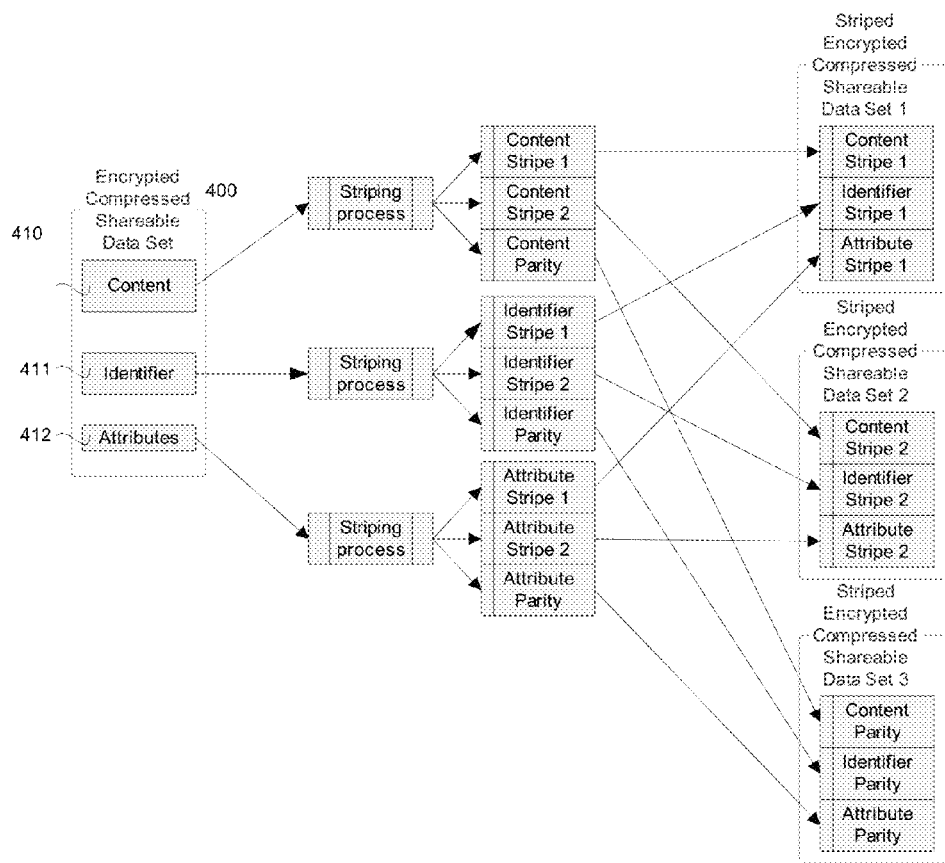

As shown in the example of FIG. 4, the shareable set content, the identifier, and the attribute are processed separately. If striping is used, the identifier and content should be striped separately. Referring forward to the transmission structures, this can imply that a single data sequence can, at a minimum, transform into at least two separate transmission structures, one of which is for the data content and identifier portion (FIG. 5A), and the other for the attributes (FIG. 5F). It can be up to the originating device to keep track of the sequence number(s) for the attribute data so that it can be updated independently of the other parts at a future time.

If the number of available target devices is expected to vary frequently, a redundancy hysteresis method can be applied. This is a method in which the redundancy numbers are specified as one or more sets, with the highest being the maximum, the smallest being the minimum, and any mid-level values being optimums for various purposes. This allows an originating device to distribute data to more target devices than the minimum user-specified redundancy to increase reliability, yet respond dynamically to periods in which a lesser number of target systems are available, as long as the number of target systems meets the minimum user-specified redundancy requirement.

To implement redundancy hysteresis, distribution of data can take place to the largest redundancy specified number of target systems, yet redistribution of data, and errors due to too low of a redundancy can be suppressed until the number of available target systems drops below the applicable minimums.

In one embodiment an originating device may choose to not use a target device that does not meet some criteria. For example, an originating device might choose not to use target devices that are portable devices for sensitive information to reduce the likelihood of it physically being present on a device outside a known location.

Once a shareable data set, a stripe of it, or related parity information, has been identified for sharing with a specific target device, a transmission structure can be created for transmission to the target device. The communication method is one of the many known methods for transferring data between devices.

Figure 5A:
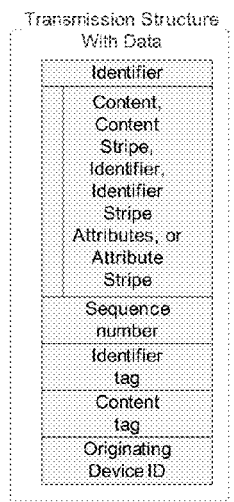
FIGS. 5A-5H illustrate communication data structures.

FIG. 5A shows an exemplary transmission structure with content data.

Figure 5B:
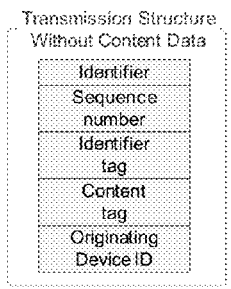

FIG. 5B shows an exemplary transmission structure without content data.

The transmission structure set can combine an identifier that specifies the information as a shareable data set or a related portion thereof, the shareable data set itself, a sequence number, the identifier tag for the data sequence, the content tag for the data sequence content, and the originating device identifier.

The transmission structure sequence number can be in context of the related shareable data set, and can facilitate the restoration of the data in case of unavailability of the originating device. The identifier tag for the data sequence can identify what data sequence the transmission structure is related to in the context of the originating device. The originating device identifier can be used to identify the originating device for later restoration of distributed data.

The target device can receive, and acknowledge, the transmission structure. The communication method can determine the timing of the acknowledgments and the number of parallel or in-sequence transmissions that are taking place at any given time. The target device can notify the originating device if it is unable to store the transmission structure. In one embodiment, a successful transmission should only be indicated once the data contained in a transmission structure is successfully stored in non-volatile memory.

Originating devices can maintain a list of transmitted structures for validation and verification purposes.

Figure 5C:
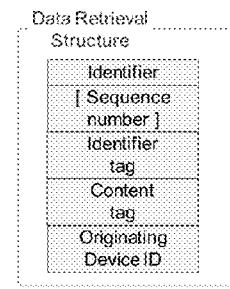

To retrieve transmitted structures from a target, an originating device can issue a data set retrieval structure, such as the one shown in FIG. 5C. This can consist of an identifier that specifies the information as a retrieval request, followed by the related sequence number, the identifier tag, the content tag, and the originating device identifier. The sequence number may be omitted, in which case the target device can respond with some or all stored structures that match all of the other parts of the request.

The format in which transmitted structures are sent from the target device to the originating device can be the same transmitted structure format used by the originating device originally. It can also be different, or an off-line method, such as using an application, or a portable storage device.

Validation is the process of confirming that a target device stores a given data sequence. Distributed transmission structures can be validated periodically to confirm that redundancy requirements continue to be met. If redundancy criteria are no longer met, the related data can be re-distributed, or if absolute minimums are no longer met, an alert can be made to the user or administrator.

Figure 5D:
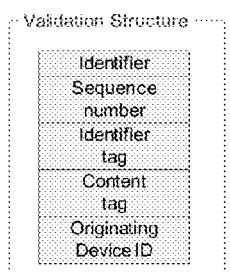

Validation of data can be done using a validation structure, such as that of FIG. 5D, that is transmitted to a target device known to store a transmission structure. The validation structure can contain an identifier that specifies the information as a validation structure, followed by the related sequence number, the identifier tag, the content tag, and the originating device identifier.

A target device can respond to the transmission of a validation structure with a message that specifies if the transmission structure continues to be available on the target device. The determination can be based on a match of the originating device identifier, data sequence identifier tag, data sequence content tag and sequence number, with the same in a list maintained by the target device.

Figure 5E:
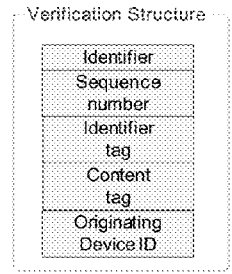
Figure 5F:
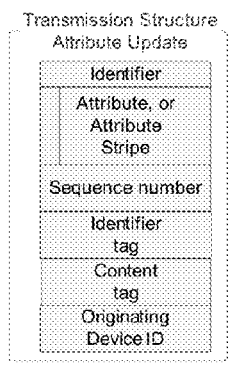

Verification is the process of confirming that a given data sequence on a target is present and is retrievable in its unmodified original form, for example by reading the stored data and comparing it to related content tags and identification tags, or using other error detection methods. The originating device can issue a verification structure, such as that of FIG. 5E. The verification structure can be identical to a validation structure, except that the identifier specifies verification instead. Verification transactions can require additional processing by the target, and thus ordinarily take place less frequently than validations.

A target device can respond to the transmission of a verification structure with a message that specifies if the specified transmission structure continues to be available on the target device, and if the structure continues to be readable from its storage media without an error.

The originating device can also verify that its local data sequences that contain the original data are still valid and accessible. This can allow for automatic retrieval of local data sequences that have become damaged, but that have not yet been detected as such by the device.

Updates to transmitted structures can take place either as a partial update, for example to update attribute data, or as a complete update. Both updates can be issued using the standard transmission structure, with the distinction that to perform a complete update the originating device first issues removal structures to remove the transmitted structures from the target device. FIG. 5F shows an exemplary attribute update transmission structure.

Figure 5G:
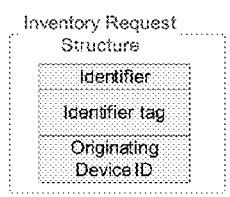
Figure 5H:
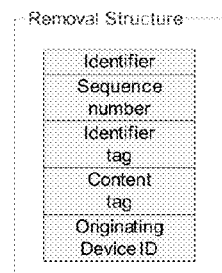

To remove a transmitted structure from a target, an originating device can issue a removal structure. This can consist of an identifier that specifies the information as a removal structure, followed by the related sequence number, the identifier tag, the content tag, and the originating device identifier. The sequence number may be omitted, in which case the target device will remove any transmitted structure that match the other tags and identifiers. In one embodiment, for data protection purposes, a removal structure can include a data sequence identifier tag and originating device identifier. FIG. 5H shows an exemplary removal structure.

A target device can store transmitted structure in an appropriate form for the devices and available media. If the media does not provide for inherent error detection, a target can, but is not required to, implement an additional error detection algorithm, such as a Cyclic Redundancy Check, to support periodic verification of the transmitted structures.

A target device can also store the time at which a transmitted structure was first stored, and when it was last validated or verified. If a transmitted structure is not validated or verified over a period of time that can be specified by the user or administrator, the structure can be considered "orphaned". Orphaned transmitted structures can be archived using other backup methods, or deleted either immediately, during a periodic or user-initiated garbage collection cycle, or when the related storage media is running out of available storage space. A target device can also query other devices to determine if a structure that appears to be orphaned should be retained.

Devices can enhance the security of the information they store on other devices by making the originating device identifier unique for each target system. Multiple methods can exist for creating such unique identifiers, but they can be computed using a mechanism that can be replicated at a later time without access to the originating device. One such method is to combine the target device identifier with the originating device identifier using one of the several algorithms discussed above, that generate a unique identifier for a data sequence. Such identifier can later be recreated for restore purposes if the originating and target device identifiers are known.

For security purposes, the target and originating device identifiers for any device are recommended to be different. This reduces the ability of third parties with limited access to obtain sets, albeit encrypted and potentially incomplete, of distributed data.

The restoration of distributed data can be an automated process. If a single data sequence is to be restored, the originating device can request the related target devices for the various transmission structures using the retrieval structure.

If all data distributed from an originating device is to be restored, a user or administrator can specify the machine or human readable identifier for the original originating device on a new device that will be the restore device and the encryption keys or passwords that were used to protect the distributed data. The restore device can contact available target devices to inquire what information they have stored for the original originating device, using a distributed data inventory request structure, such as that of FIG. 5G. It is also common practice for backup programs such as Windows Backup to create an index of all data that is backed up. Such an index can then be stored on other media, and on target devices as data sequences, and used to restore some or all backed up data sequences for the originating device. An attribute value can be used to identify index sequences for purposes of restoration.

The distributed data inventory request structure can contain an identifier that specifies the inventory request, followed by the originating device identifier, and optionally an identifier tag. If the identifier tag is present on the target, the target can respond with an inventory of some or all transmitted structures related to the specified data sequence. Otherwise an inventory of some or all transmitted structures for the particular originating device can be returned.

The inventory can be provided in a format identical to the validation structure, except that the structure is prepared by the target device and transmitted to the restore device. A response can consist of one or more such structures, or an error indicating the lack of related data.

To restore any individual data sequence, the restore device can use the inventory data to prepare a complete list of distributed data sequences, and the targets that they, or portions of them, reside on. Then the restore target can read individual transmitted structure using retrieval structures, as described above.

The availability of the distributed shared storage as described herein for any particular device can be determined using several well-known interconnected device feature advertisement methods. The presence of the capability can, for example, be an attribute in a hierarchical management set, such as the Lightweight Directory Access Protocol (LDAP), Domain Name System, or Microsoft Active Directory. The presence of the capability can also be advertised using peer-to-peer methods such as broadcasts, or a dynamic server-centric identification process.

To enroll a specific device in the distributed shared storage, the user or administrator can activate appropriate software on the device. Depending on the communication methods between devices, and the capability advertisement methods, the software might request the user or administrator to also enter authentication codes as necessary to enable the related communication methods.

Regardless of the form in which the advertisement and enrollment takes place, a list of participating devices is either available via a communication query to all related participating devices or each participating device maintains such a list locally to the device.

Embodiments of the present invention can include a computer readable medium, such as computer readable storage medium. The computer readable storage medium can have stored instructions which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory or any media or device suitable for storing instructions and/or data. The present invention can include software for controlling both the hardware of a computer, such as general purpose/specialized computer(s) or microprocessor(s), and for enabling them to interact with a human user or other mechanism utilizing the results of the present invention. Such software may include, but is not limited to, device drivers, operating systems, execution environments/containers, and user applications.

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

The invention claimed is:

1. A computer-based method for a network of network devices comprising:
    checking the network to see if a certain number of copies of data are backed up onto one or more peer devices of the network devices;
    wherein the checking includes deriving a content tag from content of the data; and
    sending one or more requests to the one or more network devices of the network, the one or more requests including the content tag, the one or more network devices using the content tag to determine if a copy of the data is stored on the one or more network devices;
    if the certain number of copies of the data are not backed up on the one or more peer devices of the network devices, backing up the data on at least some of the network devices;
    if the certain number of copies of the data are backed up on the one or more peer devices of the network devices, not making additional copies of the data on the network devices; and
    dynamically adjusting the certain number based on network state, peer device state, elapsed time, and data to be backed up.

2. The computer-based method of claim 1, wherein a peer device of the one or more peer devices needs to meet certain criteria before the peer device is used to store backups.

3. The computer-based method of claim 2, wherein mobile devices are not used to store backups.

4. The computer-based method of claim 1, wherein if the certain number of copies of the data are backed up on the one or more peer devices of the network devices, a pointer to the data is stored on one of the one or more network devices.

5. The computer-based method of claim 1, wherein the data is divided into stripes before storing the data.

6. The computer-based method of claim 5, wherein the stripes include at least one parity stripe.

7. The computer-based method of claim 1, wherein the certain number depends on the type of data.

8. The computer-based method of claim 1, wherein the certain number is smaller or larger for some data as compared to other data.

9. The method of claim 8, wherein the content has associated identifier information.

10. The method of claim 9, wherein the identifier information is used to create an identifier tag.

11. The method of claim 10, wherein the identifier tag is sent to other devices in the network.

12. The method of claim 1,
    wherein a distribution of the data uses the certain number as a threshold; and
    wherein a redistribution of the data occurs when the number of copies drops below another threshold, wherein the another threshold is lower than the threshold.

13. The method of claim 1, wherein some of the network devices are used to store parity data related to the data.

14. The method of claim 1,
    wherein the one or more network devices in the network use two identifiers:

a first identifier to identify a device of the one or more network devices to others as a participating target device; and a second identifier used when the device of the one or more network devices stores data onto other devices of the network.

15. The method of claim 1, wherein to restore data for a device of the network, available peer devices of the network devices are contacted to inquire what information is stored for the device of the network.

16. The method of claim 15, further comprising sending identifiers and identifier tags to the available peer devices for the restore.

17. The method of claim 1, wherein verification and validation of backup data at the one or more peer devices is done at certain times after the one or more peer devices store the backup data.

18. The method of claim 17, wherein backup data stored on a peer device of the one or more peer devices that is not validated or verified within a certain period of time is garbage collected.

19. A method comprising:

backing up copies of files on a device onto other devices of a network;

wherein the backing up includes dividing the files into stripes;

deriving a content tag from content of one of the stripes;

sending requests to at least some network devices of the network, the requests including the content tag, the at least some network devices using the content tag to determine if a copy of the one of the stripes is stored at the at least some network devices;

receiving responses to the requests from different devices of the at least some network devices indicating whether the one of the stripes is stored at the different devices; and determining based on the response whether one or more backup copies of the one or more stripes should be stored on the network.

20. The method of claim 19, wherein the stripes do not correspond to storage device boundaries.

21. The method of claim 19, wherein parity stripes are also stored on devices of the network.

22. The method of claim 19, wherein if a certain number of copies are already backed up on the network, the another copy is not made; and wherein if not making another copy, storing a pointer instead.

23. The method of claim 19, wherein the stripes are variably sized.

24. The method of claim 19, wherein if a certain number of copies of data are already backed up on the network, a device does not create additional copies of the data.

25. The method of claim 19, wherein, in some cases, a pointer to the data is stored, rather than making additional copies of the data.

26. The method of claim 24, wherein the certain number depends on the type of data.

27. The method of claim 19, wherein the devices need to meet certain criteria before the devices are used to store backups.

28. A method comprising:

checking a network of network devices to see if a certain number of copies of data are backed up onto one or more peer devices of the network;

wherein the checking includes deriving a content tag from content of the data; and sending one or more requests to the one or more peer devices of the network, the one or more requests including the content tag, the one or more peer devices using the content tag to determine if a copy of the data is stored on the one or more peer devices;

if the certain number of copies of the data are not backed up on the one or more peer devices of the network, backing up the data some of the network devices;

if the certain number of copies of the data are backed up on the one or more peer devices of the network, not making additional copies of the data on the network devices; and dynamically adjusting the certain number based on network state, peer device state, elapsed time, and data to be backed up.

29. The method of claim 28, wherein if the certain number of copies of the data are backed up on the one or more peer devices of the network, a pointer to the data is stored on one of the peer devices.

30. The method of claim 28, wherein the data is divided into stripes before storing the data.

31. The method of claim 30, wherein the stripes include at least one parity stripe.

32. The method of claim 28, wherein the certain number depends on the type of data.

33. The method of claim 28, wherein the certain number is smaller or larger for some data than for other data.

* * * * *